Figure 1:
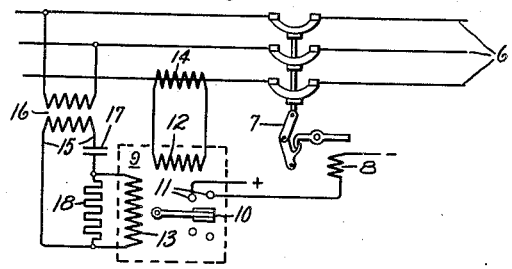

Jan. 24, 1933.  O. C. TRAVER  1,895,355
PROTECTIVE APPARATUS
Filed April 28, 1930

Inventor.
Oliver C. Traver,
by Charles W. Mullan
His Attorney

Patented Jan. 24, 1933

1,895,355

UNITED STATES PATENT OFFICE

OLIVER C. TRAVER, OF DREXEL HILL, PENNSYLVANIA, ASSIGNOR TO GENERAL ELECTRIC COMPANY, A CORPORATION OF NEW YORK

PROTECTIVE APPARATUS

Application filed April 28, 1930. Serial No. 447,810.

My invention relates to improvements in protective apparatus for electric circuits and more particularly to improvements in the control of electric power lines under abnormal conditions whereby to obtain more definite, sensitive and reliable operation of fault-responsive protective devices such as relays and the like.

Severe faults, such as heavy short-circuits, occurring on a power line, especially if relatively close to a station where protective relays are located, may reduce an electric quantity of the line, for example the voltage, to less than one percent of normal. Under such conditions, relays whose operation is dependent either wholly or partly on the line voltage may take too long to operate or even fail to operate. Relays thus affected are, for example, power directional relays, so-called distance relays, and others. Any attempt to amplify the voltage on the relay windings under abnormal conditions, if it also amplifies the voltage correspondingly under normal conditions, defeats its own purpose because the relay windings would burn up at normal line voltage or the design would be impractical. An object of my invention is to provide an improved arrangement for so amplifying the energization of the relay under abnormal line conditions without amplification under normal line conditions as to insure the desired and intended operation of such relays as might be otherwise affected by the lack of the necessary energization. My invention, in general, relates to protective apparatus of the type described and claimed in the copending application of Albert R. van C. Warrington, Serial No. 447,934, filed April 28, 1930, for protective apparatus and assigned to the same assignee as this invention.

Any amplifying arrangement used with relays, for example power directional relays, whose proper operation is dependent on the phase relation between two electric quantities, for example the current and the voltage of the circuit to be protected, should not materially affect this phase relation as reflected in the relay windings themselves. In order, therefore, that the phase relation response of the relay may be a true reflection of the phase relation between the current and voltage of the circuit of the line to be protected under all voltage conditions thereof, a further object of my invention is to provide an improved amplifying arrangement such that the phase relation between the voltage derived from the line to energize the voltage winding of the relay and the current in the voltage winding of the relay remains practically fixed under all line voltage conditions.

My invention will be better understood from the following description when considered in connection with the accompanying drawing and its scope will be pointed out in the appended claims.

Figure 2:
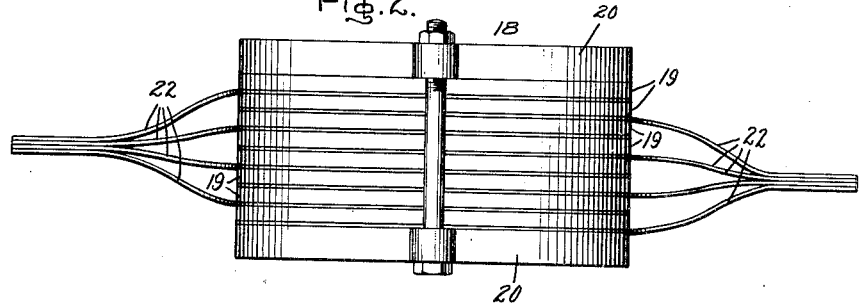
Figure 3:
Figure 4:
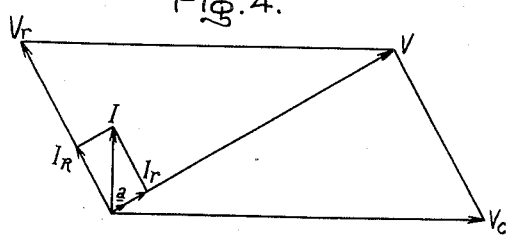

In the accompanying drawing Fig. 1 illustrates diagrammatically protective apparatus embodying my invention; Fig. 2 is a view of a current limiting means suitable for use in carrying out my invention and Figs. 3 and 4 are vector diagrams explanatory of my invention.

In accordance with my invention, I provide the desired amplification of the energization of an electroresponsive device by an energizing circuit which is substantially resonant at line frequency for abnormal conditions of the line to be protected, for example voltage on one side of predetermined value but has its resonance impaired under other line conditions including normal, for example voltage on the other side of the predetermined value. The predetermined value chosen is that percentage of the normal line voltage which will insure the desired operation and which, of course, varies with the construction and character of the line to be protected as well as the relay chosen for protection.

In Fig. 1 there is shown an embodiment of my invention for protecting a polyphase alternating current power line 6 which is arranged to be controlled by a latched-closed type of circuit breaker 7 having a trip coil 8.

For controlling the circuit breaker 7 in response to abnormal line conditions, I have shown an electroresponsive device, such as a protective relay 9, whose operation is dependent on the voltage of the line. As shown, this relay is arranged to control the circuit of the trip coil 8 through its contacts 10, 11 and may have one or more windings 12, 13. The relay 9 may be any relay having a voltage responsive winding 13, for example a power directional relay, a so-called distance relay or an element of a distance relay. As shown, it also has the cooperating current winding 12 which is connected to be energized in accordance with the current of the line 6 through suitable means such as a current transformer 14. The voltage winding 13 forms part of an inductive or electromagnetic operating element of the relay 9 and is connected in an energizing circuit 15 which is connected to be energized in accordance with the voltage of the line 6 through suitable means such as a potential transformer 16.

In accordance with my invention, the energizing circuit 15 is resonant at line frequency when the voltage of the line 6 is on one side of a predetermined value but has its resonance impaired when the voltage is on the other side of this value. For this purpose the energizing circuit 15 includes a capacitance element, such as a condenser 17, which is tuned for resonance at line frequency with the inductance of the voltage element of the relay. This insures a good working voltage for the relay 9 even when the line voltage is very greatly reduced. In order, however, that there may not be sufficient voltage on the winding 13 to destroy it when the line voltage is above the predetermined value or at normal, I provide means for impairing the resonance of the energizing circuit 15 when the predetermined value of voltage is exceeded such that the phase relation between the voltage derived from the line to energize the voltage winding of the relay and the current in the voltage winding 13 remains practically fixed under all voltage conditions of the circuit 6.

Further in accordance with my invention, I impair the resonant condition by substantially noninductive current limiting means such as resistances having a volt-ampere characteristic which differs from Ohm's law. Examples of such resistances are well known to the art. In the case of series-resonant circuits the resistance preferably has a volt-ampere characteristic such that its ohmic value decreases with increase of voltage. As shown the current limiting means is a resistance 18 connected in parallel with the voltage coil 13 of the relay 9. While any suitable resistance means may be used, I preferably employ in case of series-resonant circuits a carbon-carborundum type of resistance material, having a negative volt-ampere characteristic, such as is disclosed and claimed in United States Letters Patent 1,822,742, issued September 8, 1931, on an application of K. B. McEachron, and assigned to the same assignee as this invention. Resistance devices embodying this material have an exponential characteristic $I = KE^n$, I and E being respectively the current in and the voltage across the resistance, K a constant and $n$ a number greater than one. Moreover, as this material has no time lag, the current changes substantially instantaneously with the change in the voltage.

When the voltage of the circuit 15 is below some predetermined value, the resistance 18 permits substantially no current flow through it. Under these conditions the condenser 17 and the relay winding 13 are resonant at the line frequency because the resistance 18 is in effect infinite and the effective inductance of the combination of this resistance and the relay winding is substantially the inductance of the winding alone. As the voltage rises above the predetermined value, the resistance 18 takes an increasing proportion of the current in the circuit 15 thereby changing the effective inductance of the combination of the resistance and the relay winding. Consequently the resonance of the circuit is gradually impaired until at normal voltage the total current of the circuit 15 is limited almost entirely by the series condenser 17.

As shown in Fig. 2, the resistance 18 may comprise a plurality of resistance elements, such as disks 19 of the carbon-carborundum type, assembled between suitable clamping members 20 of insulating material. Between the elements are mounted suitable conducting plates 22, the alternate ones of which are connected to form the terminals. As shown, the stacking is for two groups of four disks each, in parallel connection. Obviously, when the disks are made in standard size units, any suitable stacking can be used to secure the desired resistance value.

Fig. 3 represents vectorially the conditions when the energizing circuit 15 is resonant. In this figure $V_c$ and $V_r$ represent the voltages across the condenser 17 and the relay winding 13 respectively. $V_r$ also represents the voltage across the parallel resistance 18. These voltages are approximately 180° apart and their resultant V is the voltage across the energizing circuit 15, this voltage being proportional to the voltage of the line 6. The vector $I_r$ represents the current in the relay winding 13. Under the resonant condition the resistance 18 passes practically no current. As the voltage V across the energizing circuit increases, the resistance 18 passes an increasing proportion of the current of the circuit 15 and the conditions are as shown in Fig. 4, the circuit 15 being no longer resonant. In this figure, $I_R$ and $I_r$ represent respectively the currents in the resistance 18 and the relay winding 13 and $a$ represents the resistance voltage drop in the relay winding 13. It will be observed from Figs. 3 and 4 that the current in the relay winding remains substantially in phase with the voltage V of the energizing circuit 15. This ability to maintain a practically fixed phase relation between the current in the voltage coil of the relay and the voltage of the energizing circuit is particularly advantageous in connection with directional relays since it is thus possible to have maximum torque at a given power factor of the line irrespective of the conditions of the line current and voltage.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with an electroresponsive device having an operating winding, a substantially resonant energizing circuit including said winding, and means for impairing the resonance of said circuit when the voltage thereof differs from a predetermined value including a resistance whose ohmic value decreases with increase of voltage.

2. In combination with a relay having an operating winding, a substantially resonant energizing circuit including said winding, and means for impairing the resonance of said circuit when the voltage thereof is above a predetermined value including a resistance connected in parallel with the winding and having an ohmic value which decreases with increase of voltage.

3. In combination with an electroresponsive device having an operating winding, a substantially resonant energizing circuit for said winding including a condenser in series with the winding, and means for impairing the resonance of said circuit when the voltage thereof is above a predetermined value including a resistance connected across said winding and having a characteristic such that its ohmic value decreases with increase of voltage.

4. In combination with a relay having an electromagnetic operating element including a winding, an energizing circuit for said winding including a condenser in series with the winding, the capacitance of said condenser being substantially resonant with the inductance of said element, and means for impairing the resonance of said condenser and said element when the voltage of said circuit is above a predetermined value including a resistance connected in parallel with said winding and having the characteristic $I=KE^n$, I and E representing respectively the current in and the voltage across the resistance, K being a constant and $n$ a number greater than one.

5. In combination with an electroresponsive device having an electromagnetic operating element, an energizing circuit therefor including a condenser element, the capacitance of said condenser element being substantially resonant with the inductance of said operating element, and means for impairing the resonance of said elements when the voltage of the circuit is above a predetermined value including a resistance connected in circuit with only one of said elements.

6. In combination with an electric power line, means responsive to abnormal conditions of the line including a directional relay having cooperating current and voltage windings, a series-resonant circuit connected to be energized in accordance with a voltage of the line and including said voltage winding and a condenser, and means for impairing the resonance of said circuit when said line voltage is above a predetermined value including a resistance connected across said voltage winding and having a characteristic such that its ohmic value decreases with increase of voltage.

7. In combination with an electric power line, means responsive to abnormal conditions of the line including a relay having an inductance element, a series-resonant circuit connected to be energized in accordance with the voltage of said line and including said inductance element and a capacitance element, and means for impairing the resonance of said circuit when said line voltage is above a predetermined value including a resistance connected in parallel with one of said elements and having a characteristic such that its ohmic value decreases with increase of voltage.

8. In combination with an electric power line, means responsive to abnormal conditions of the line including a relay having an inductance element, a series-resonant circuit connected to be energized from said line and including said inductance element and a capacitance element, and means for normally impairing the resonance of said circuit including a resistance connected in parallel with one of said elements and having a characteristic such that its ohmic value decreases with increase of voltage.

9. In combination with an electroresponsive device, a substantially resonant energizing circuit including said device, and non-inductive current limiting means for impairing the resonance of said circuit when the voltage of the circuit differs from a predetermined value.

10. In combination with an electroresponsive device having an inductance element, a substantially resonant energizing circuit including a capacitance element and said inductance element, and resistance means connected in circuit with only one of said elements for impairing the resonance of the circuit when the voltage thereof differs from a predetermined value.

11. In combination, an electric power line, means responsive to abnormal conditions of the line including a device having an inductance element, a resonant circuit including said inductance element and a capacitance element and means for normally impairing the resonance of said circuit operative to restore the resonant condition upon the occurrence of an abnormal line condition including a resistance connected in circuit with one of said elements and having a characteristic such that its ohmic value decreases with increase of voltage.

In witness whereof, I have hereunto set my hand this 25th day of April, 1930.

OLIVER C. TRAVER.